United States Patent [19]

Worthington, Jr.

[11] 3,715,157

[45] Feb. 6, 1973

[54] PROJECTION APPARATUS FOR MULTIPLE-SECTOR SLIDE TRANSPARENCIES

[75] Inventor: Harvey R. Worthington, Jr., Cambridge, Mass.

[73] Assignee: Searle Medidata Inc., Waltham, Mass.

[22] Filed: Nov. 19, 1969

[21] Appl. No.: 878,025

[52] U.S. Cl. ..........................353/25, 353/34, 353/89
[51] Int. Cl. ........................G03b 21/26, G03b 21/14
[58] Field of Search..........353/25, 26, 27, 30, 34, 82, 353/88, 89, 94, 95; 550/166, 172

[56] References Cited

UNITED STATES PATENTS

| 3,338,131 | 8/1967 | Klein | 353/25 |
| 3,463,583 | 8/1969 | Collis | 353/89 |
| 2,674,919 | 4/1954 | Rodriguez | 353/82 |
| 3,598,035 | 8/1971 | Haller | 355/53 |
| 3,566,370 | 2/1971 | Worthington et al. | 353/25 |

FOREIGN PATENTS OR APPLICATIONS

| 464,683 | 12/1968 | Switzerland | 353/26 |
| 14,722 | 10/1916 | Great Britain | 353/82 |

Primary Examiner—Leonard Forman
Assistant Examiner—A. J. Mirabito
Attorney—Joseph Weingarten

[57] ABSTRACT

Apparatus for selectively projecting images of one or more sectors of a multiple sector slide transparency. The apparatus, with its various embodiments, is operative to select any single sector of a particular slide for projection onto a screen and its further operative to superimpose the image of one sector of a slide upon the image of another sector of the same slide.

9 Claims, 10 Drawing Figures

INVENTOR
HARVEY R. WORTHINGTON, JR.
ATTORNEYS

INVENTOR
HARVEY R. WORTHINGTON, JR.

ATTORNEYS

PROJECTION APPARATUS FOR MULTIPLE-SECTOR SLIDE TRANSPARENCIES

FIELD OF THE INVENTION

This invention relates in general to slide projectors and more particularly concerns a novel arrangement for projecting images of one or more sectors of a slide which has been divided into a plurality of sectors.

DISCUSSION OF THE PRIOR ART

Slide transparencies are a convenient and compact means for storing information. The information stored on slides may range from pictures used for entertainment to highly complex word information used for educational or automated testing purposes. In order to be useful, the information stored upon slides must be capable of retrieval in a form which may readily be visually utilized. Many slide projectors have been developed over the years which project the image from a slide onto an appropriate surface such as a wall or a screen. The slide to be projected may be changed manually or automatically, but it is generally necessary, in order to change the image being presented on the projecting surface, to physically remove the slide from the vicinity of the light beam of the projection lamp and to replace that slide with a different slide. This, of course, requires a considerable amount of motion and a commensurate period of waste time. By dividing a slide transparency into several sectors, each sector containing different information, it is possible to significantly increase the storage capacity and consequently the usefulness and efficiency of such a slide. However, efficient and fully acceptable means have not previously been available for selective projection of one or more sectors of such multiple sector slides.

SUMMARY OF THE INVENTION

The primary object of this invention is to provide projection apparatus particularly adapted for use with multiple sector slides. The invention further enables slide transparencies to be used more efficiently and decreases information retrieval time because the time required for this projection apparatus to shift from one sector to another of a single slide is substantially less than that required to change slides.

Broadly speaking, this invention includes a novel optical assembly, preferred embodiments of which are adapted to selectively project one of a plurality of sectors of information contained on a single slide. Another preferred embodiment permits the selective projection of one or more sectors of the slide simultaneously so that information may be presented in superimposed fashion. Although the description hereinbelow is concerned with a quadrature arrangement wherein the slide has four sectors, the concept of this invention is sufficiently broad to encompass structures capable of operation with slides having any practical number of sectors.

One embodiment of the invention permits the selective projection and focusing of a single sector of a slide at a plane disposed a predetermined distance from the slide. An appropriate viewing screen may be located at this distance if desired and for purposes of this description its presence will be assumed. This arrangement has four projection lenses, one for each sector of the slide, and three pivoted opaque shutter vanes controlled by solenoids so as to selectively occlude all or all but one sector of the information-containing light beams being focused by the four lenses to coincide on the viewing screen at the predetermined image distance.

A second embodiment is very similar to the first except that four shutter vanes are used so that any number of the slide sectors, from one to four, may be projected onto the viewing screen at the same time. This is particularly useful in cases where it is desirable to show changes by superimposing one image over another. Other embodiments are concerned with alternative arrangements for the projecting lenses and for focusing the images at different distances.

BRIEF DESCRIPTION OF THE DRAWING

The invention will be more fully understood from the following detailed description, taken in conjunction with the accompanying drawing, in which.

DESCRIPTION OF THE PREFERRED EMBODIMENTS

Figure 2:
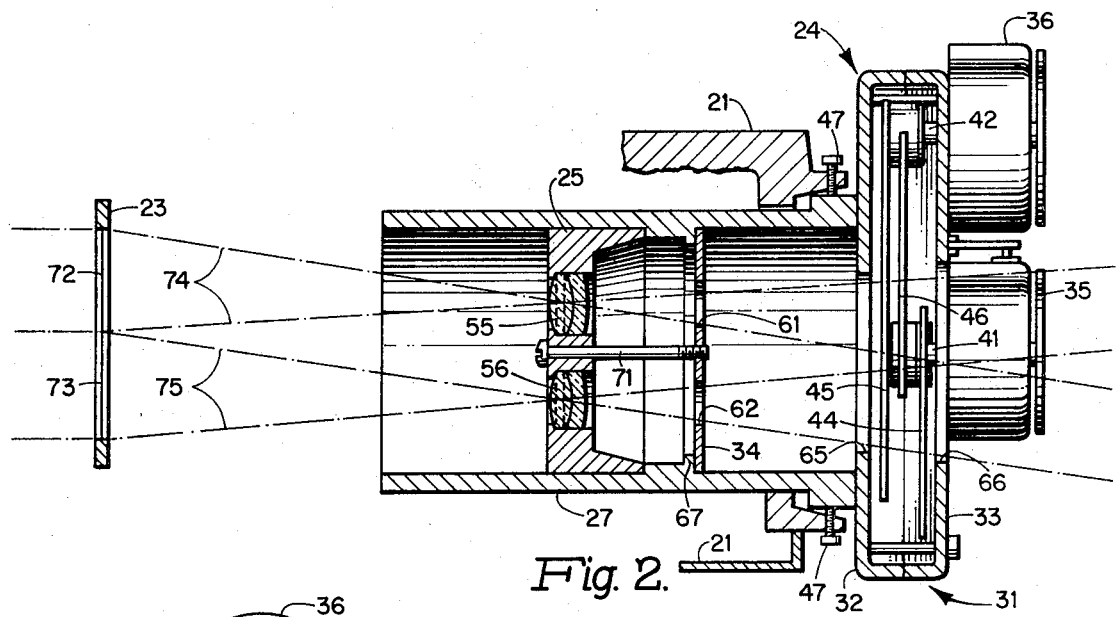
FIG. 2 is an enlarged sectional view taken through cutting plane 2—2 of the optical assembly portion of the slide projector of FIG. 1.

The projection apparatus of this invention may be adapted for use with nearly any type of slide projector. Although it is most efficiently utilized with an automatic projector having a magazine capable of storing and providing ready access to a multiplicity of slides, it may also be used with inexpensive single or multiple slide changing apparatus, whether automatic or manually operated. For expository purposes this invention will be described in conjunction with an automatic projector having a multi-slide magazine.

With reference now to the drawing and more particularly to FIGS. 1 through 7 thereof, there is shown a slide projector 21 capable of selectively projecting the image of a single sector of a multiple sector slide and focusing the image at a plane a predetermined distance from the slide, preferably onto a viewing screen or other suitable surface (not shown). Slide projector 21, together with optical assembly 24, may be equipped with random selection feature which enables it to project a particular sector of any desired slide at any given time. That is, both slide selection by the projector and sector selection by the optical assembly may be operable for random access to any desired sector of any slide in slide magazine 22. The projector may alternatively be equipped to project images in a certain predetermined sequence. In situations where only a relatively small degree of information access flexibility is necessary, it is possible that a sequential slide changer, coupled with means for providing random access to the sectors of each slide, would be adequate. This would permit the use of a substantially less expensive slide changer control means in place of the random access system.

Figure 7:
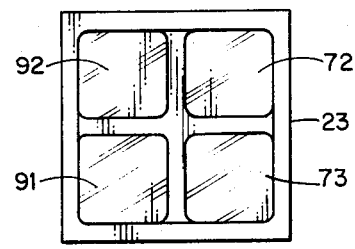
FIG. 7 shows a typical slide for use with the slide projector of FIG. 1.

As a particular example of equipment which is satisfactory for use with this invention, projector 21 may be a Kodak Carousel RA-950 with automatic slide changer (not shown) which is sold by Eastman Kodak Company. The particular magazine 22 shown is capable of storing 80 slides 23 (as shown in FIG. 7), each of which is arranged with multiple sectors of information. The optical assembly normally supplied with the above projector has been removed and replaced with the unique optical assembly 24 of this invention. This optical assembly is capable of projecting any one sector of a slide positioned by the projector for projection, or may alternatively prevent the projection of any slide information.

For purposes of description, it will be assumed that slide 23 is divided into four sectors, although the particular number of sectors is not otherwise important. Optical assembly 24 is equipped with a four-lens array, each projection lens being arranged to focus one of the four sectors of slide 23 at a plane disposed a predetermined distance from the slide. The shutter portion of the optical assembly is so constructed as to be capable of selecting any one of the slide sectors for projection onto the viewing surface at any particular instant in time. This particular arrangement of four-sector slides, together with the unique optical assembly of this invention, allows the effective slide capacity of any projector magazine to be quadrupled. Thus, slide projector magazine 22 effectively contains 320 different slide images, each of which may be individually shown on a viewing screen. It is apparent that different types of projectors may have slide magazines of different capacities and that the slides may be divided into more or less than four sectors. Thus, the number of different images immediately available for showing will be the number of the slides in the magazine multiplied by the number of sectors on each slide.

Optical assembly 24 is constructed so as to replace the conventional optical projection assembly with which projector 21 is normally equipped and provides comparable optical results while utilizing the existing projection lamp of the projector. No significant structural modifications are required to be made to the projector itself. It should also be evident that optical assemblies of different projectors are configured somewhat differently and that optical assembly 24 would have to be suitably modified to adapt it for each particular projector. Such modifications are normally only design expedients and well within the scope of this invention.

With specific reference now to FIG. 2, it may be seen that the structure of optical assembly 24 basically comprises lens barrel or housing 27 (having external dimensions similar to the lens barrel originally designed for projector 21), shutter assembly 31 having rear enclosure member 32 and front enclosure member 33, lens mounting member 25 and aperture disc 34. Shutter assembly 31 includes three solenoids 35, 36 and 37 mounted on the front of enclosure member 33, each solenoid having respective rotatable shafts 41, 42 and 43 extending rearwardly through member 33. Secured to these respective shafts for rotation therewith are opaque shutter vanes 44, 45 and 46. The shutter vanes are so constructed and operate in such a manner that substantially square opening 66 in front member 33 is either partially or totally occluded at all times by the vanes. Another substantially square opening 65 is located in rear enclosure member 32 in alignment with normally slightly larger opening 66, and to provide access through the rear member of shutter assembly 31 for image beams from the slide sectors.

Optical assembly 24 is firmly secured to projector 21 by suitable means such as set screws 47 which bear upon the side of housing 27. When the focus of the optical assembly is to be adjusted, set screws 47 are loosened and focus adjusted in the normal manner by moving the lenses longitudinally. When the focus adjustment has been completed, set screws 47 are again tightened to secure the housing in place. Lens mounting member 25 (FIG. 4) is formed with four openings 51, 52, 53 and 54, each containing a single achromatic lens such as lenses 55 and 56 in openings 51 and 52 respectively, as shown in FIG. 2. The lenses may, for example, be cemented doublets or triplets, multi-element lenses, or any other simple or complex projection lens of suitable size and optical characteristics.

Aperture disc 34 (FIG. 5) is formed with four openings 61, 62, 63 and 64 which are aligned with the respective openings 51, 52, 53 and 54 in lens mounting member 25. The openings in this disc perform the normal optical functions of apertures in conjunction with the respective lenses. Lens mounting member 25 and aperture disc 34 are mounted within housing 27 on opposite sides of annular ridge 67 therein and are firmly held in place by suitable means such as bolt 71 which holds these members tightly against ridge 67.

Figure 6:
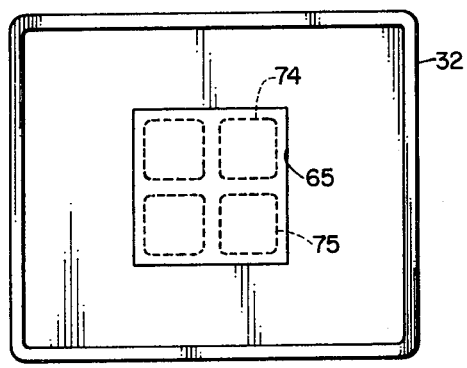
FIG. 6 is a front view of the rear plate of the assembly of FIG. 2 showing the image beams as they would appear if sectioned at that point.

A slide 23 having four distinct sectors with different information in each sector is shown in FIG. 7. It is apparent that the means for producing images from the information on any sector of the slide is substantially similar to the image producing means for any other sector, and therefore only sectors 72 and 73 of slide 23 and their associated optics will be discussed in detail herein. It may thus be seen that a bundle of light rays 74 (indicated diagrammatically in FIG. 2) originating behind slide 23 at a source of light (not shown) travels through sector 72 conveying the information imprinted therein. This beam of light or image beam is focused by means of lens 55, restricted by opening 61 in aperture disc 34, passes through opening 65 in rear shutter enclosure member 32 and, if permitted by the shutter vanes, through opening 66 in front enclosure member 33 and onto a remote viewing screen located at the focal plane of the projection apparatus. Similarly, light beam 75 transmits the information from sector 73 through lens 56, aperture 62, rear enclosure member opening 65 and selectively through front enclosure member opening 66 onto the screen. A cross section of the light beams at opening 65 in rear member 32 is shown in FIG. 6. The optical arrangement is such that when the images of the respective sectors are focused onto the screen, these sectors all occupy the same screen area, that is, they are in coincidence. This allows one slide sector to be superimposed upon another if desired and if suitable modifications, such as will be discussed later, are made to the shutter assembly of FIG. 2.

Figure 3:
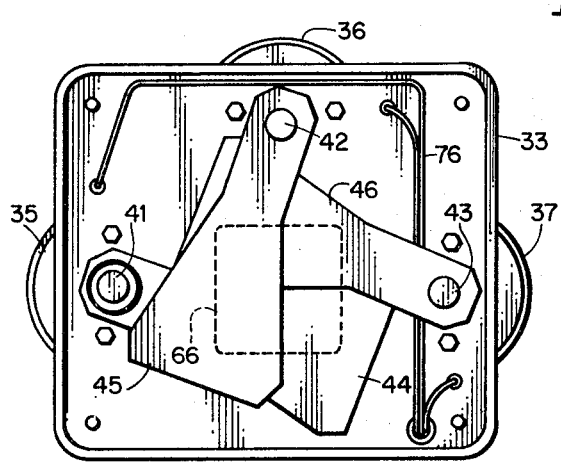
FIG. 3 shows the shutter arrangement from behind the front cover plate of the assembly of FIG. 2.
Figure 1:
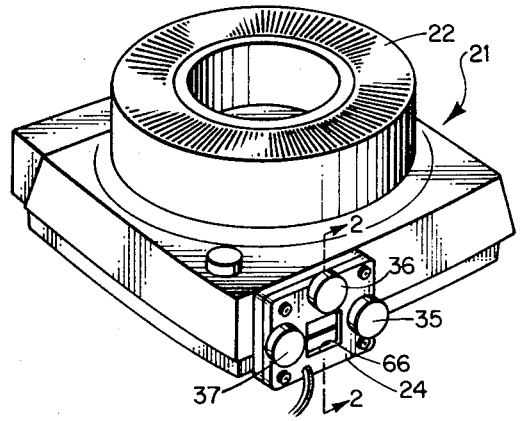
FIG. 1 is a perspective view of a slide projector constructed in accordance with the principles of this invention.

The choice of the particular sector being focused upon the screen at any given time is controlled by the position of shutter vanes 44, 45 and 46, which are in turn controlled by solenoids 35, 36 and 37. The particular orientation of the vanes in their normal position, as shown in FIG. 3, prevents any light from the projector from passing through opening 66 in front shutter enclosure member 33. In this regard it should be stated that each shutter vane has two positions separated by an angular distance that is substantially the same as the angular width of the sector-shaped vane. In the initial, or first, position one edge of the vane lies parallel to the center line of opening 66, and the blade obstructs substantially, but not less than, half of the opening. In the other, or second, position the blade obstructs the other side of the opening in a similar manner. All of the shutters are shown in their first positions in FIG. 3. If shutters 45 and 46 were both rotated counterclockwise to their second positions, the bundle of light rays 74 corresponding to the information in sector 72 of slide 23 would be transmitted through the then exposed portion of opening 66. With vane 45 still in its second position but with vane 46 returned to its initial position and vane 44 rotated counterclockwise to its second position, the bundle of light rays 75 containing the information from sector 73 of the slide is permitted to pass through opening 66. It may be seen that this shutter arrangement allows any sector of a slide to be selectively projected onto a screen, or it may prevent any image from being projected at all. The control circuitry (not shown) which provides the controls for solenoids 35, 36 and 37 may be so arranged that the entire opening 66 is automatically occluded each time a projected sector is changed. Although this is not necessary for the operation of the projection apparatus, it may be psychologically desirable so that the viewer will realize that a change has been made, especially when the information on one sector is quite similar in appearance to the information on the next sector.

The shutter assembly 31 is shown in FIG. 2 mounted on the front of housing 27 for purposes of structural convenience. The location of the shutter assembly of this invention is governed by a single criterion; namely, that the sector selective shutter assembly must be located where the image beams are separate and distinct. This means the shutters may be any place between the slide transparency and the point at which the image beams start to converge or overlap. This latter extreme is approximately where shutter assembly 31 is located in this particular embodiment. Other locations are equally useful and effective.

The wires carrying the electrical signals from the control means to the solenoids are shown in FIG. 3 and indicated by reference numeral 76. Each solenoid is independently controlled as to the position of its associated shutter vane by the appropriate associated control means.

Figure 8:
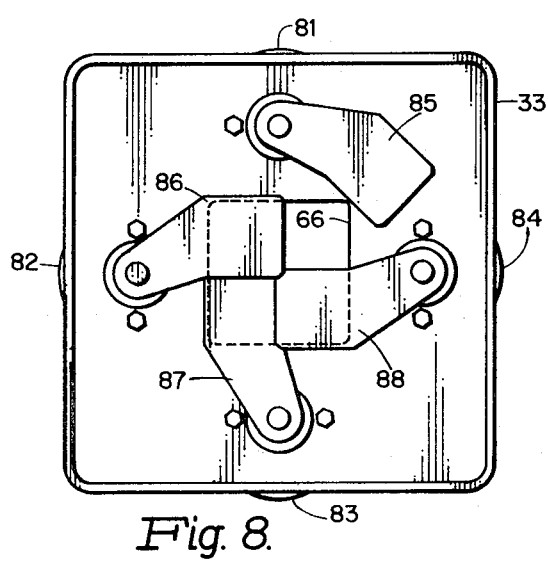
FIG. 8 is an alternative embodiment of the shutter arrangement of FIG. 3.

As alternative embodiment which allows any or all of the sectors of a single slide to be projected upon the same area of the viewing screen at the same time is shown in FIG. 8. The projection apparatus is essentially identical to that shown in FIG. 2 except for the details of the shutter assembly. In this embodiment, there are four solenoids 81, 82, 83 and 84 having their respective associated four shutter vanes 85, 86, 87 and 88 which selectively occlude portions of opening 66 in front shutter member 33. The electrical wires for providing signals for controlling the solenoids are not shown in this figure because they are not necessary for the explanation thereof. The apparatus of FIG. 8 operates very similarly to the apparatus of FIG. 3, each vane having two positions which either open or occlude a portion of opening 66 in front housing plate 33. For example, vane 85 has been rotated counterclockwise to its second position to permit projection of sector 92 of slide 23. If it were desired to superimpose sector 92 of the slide upon adjacent sector 91, both vanes 85 and 88 would be rotated counterclockwise to their second positions and the information from both slide sectors would be projected onto the same area of the viewing screen. Thus, it is apparent that any one or more of the sectors of a single slide may be projected onto the viewing screen by the apparatus shown in FIG. 8. With all four shutter vanes in their initial position, no light is projected onto the viewing screen. Similarly to the assembly of FIG. 3, this embodiment may be controlled to automatically return all shutter vanes to their first position between each change of projected slide sector.

Figure 9:
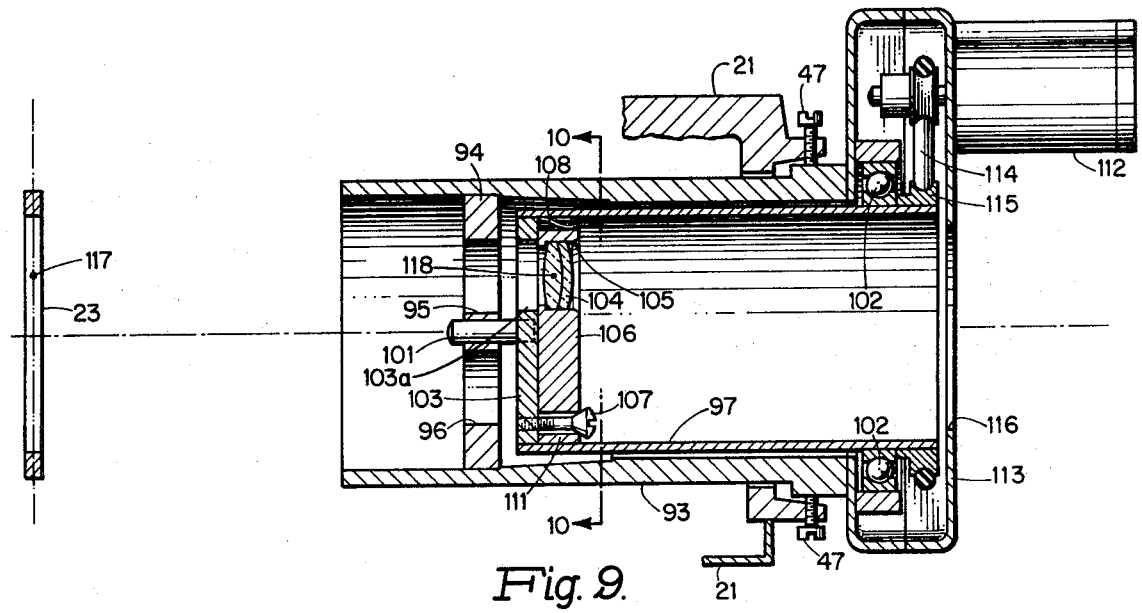
FIG. 9 is a sectional view similar to FIG. 2 of an alternative embodiment of the optical assembly of this invention.
Figure 10:
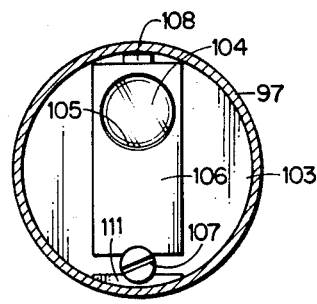
FIG. 10 is an elevational view of the lens adjustment apparatus of FIG. 9.

FIG. 9 shows another alternative embodiment for the projection apparatus of this invention wherein the lens and shutter assembly are combined into a unitary structure and, instead of four lenses, only one lens is used. The apparatus of FIG. 9 comprises lens barrel or housing 93 which is the same size as, and constructed similarly to, housing 27 of FIG. 2 and is similarly adjustably mounted within projector 21 by means of bolts 47. Plate 94 is securely mounted within housing 93 behind the projection lens and has an image beam access port for each slide sector; access ports 95 and 96 being shown in the drawing. Rotatably mounted within housing 93 is cylinder 97, the inner end of which is secured to opaque disc 103 which is in turn rotatably mounted to plate 94 by means of pin 101. The front end of the cylinder 97 is rotatably mounted to housing 93 by means of bearing assembly 102. Disc 103 has a single opening 103a which provides access for lens 104 through the disc. This lens is similar to the lenses shown in FIG. 4 and is indicated as having a duplex configuration. As shown in FIG. 10, lens 104 is mounted in opening 105 in lens mount 106, which mount is radially slidable with respect to disc 103 through the use of a conventional slide means (not shown), such as a dovetail slot arrangement. In order to allow for such adjustments in the position of lens 104, opening 103a is larger than the lens. An aperture disc, which is normally mounted within cylinder 97 forward of lens 104, is not shown in FIG. 9 because it is not necessary to the description of this embodiment. The function of the sliding lens arrangement will be described in greater detail below.

Lens 104 may be selectively aligned with any of the openings in plate 94 while the remainder of disc 103 occludes the other openings in the access plate. Cylinder 97 is rotated by means of a controllable device 112 such as a motor which is mounted on front enclosure member 113. The motor is coupled to the cylinder by means of drive belt 114 to an annular groove 115 mounted externally of cylinder 97 at the forward end thereof. Upon a proper electrical command signal, motor 112 rotates cylinder 97 together with disc 103 and lens 104 so that the lens aligns with an opening in plate 94 and simultaneously with the sector of slide 23 which is desired to be projected. Thus, although all of the information contained in slide 23 is projected through access plate 94, only that information corresponding to the slide sector which is aligned with lens 104 is projected through opening 116 in front shutter enclosure member 113 and onto the viewing screen. Any of several relatively simple well known means may be used for insuring that cylinder 97 stops at a precise position with lens 104 aligned with the desired opening in plate 94. Such a means is conventional and a description of its details is not necessary to the complete discussion of the particular invention herein set forth. It should be noted that some type of simple shutter arrangement may be included with this embodiment to ensure that the viewing screen is blanked whenever the projected image is changed.

The foregoing embodiments as described operate effectively with multiple-sector slide transparencies. Focusing adjustments may be made in the usual manner by moving the lens longitudinally. However, if it is desired to enable the images of the slide sectors to be focused and in coincidence at other than a single predetermined image distance, means must be provided for radially adjusting the location of the lenses with respect to an axis common to the image beams.

For example, in FIG. 9 the axis of one image beam is determined by the center point 117 of the slide sector in view and the center point 118 of lens 104. That axis should, ideally, converge to meet the axis of rotation of cylinder 97 at the image distance. Under such conditions the centers of the images of all the slide sectors will coincide. If the slide has fixed dimensions and if lens 104 has a fixed position on disc 103, there is one distance at which the slide images will be both in focus and in coincidence. It is, of course, possible to achieve focus without coincidence over any reasonably large distance variations simply by adjusting the axial position of the lens in the usual way.

In order to achieve focus and coincidence at an arbitrary distance with a given slide, it is necessary to adjust the radial displacement of the lens. That possibility has been shown in FIG. 9 by showing lens mount 106 to be a discrete member, slidably fastened to disc 103. A very simple means is shown by way of example for making this adjustment. A wedge-shaped bolt 107 is threaded in disc 103 between lens mount 106 and member 111. A leaf spring 108 maintains lens mount 106 in contact with bolt 107 at all times. When it is desired to increase the image distance, bolt 107 is screwed into disc 103 to force lens mount 106 radially outward. The reverse operation is performed when it is desired to decrease the image distance.

The image distance $q$ at which focus and coincidence occur together is given by the simple expression $$q = fr/(r-r^1)$$

where $f$ is the focal length of the lens involved, $r$ is the radial displacement of the center of the slide sector from the center of the slide and $r^1$ is the radial displacement of the center of the lens from the axis of rotation of disc 103 in FIG. 9.

Figure 4:
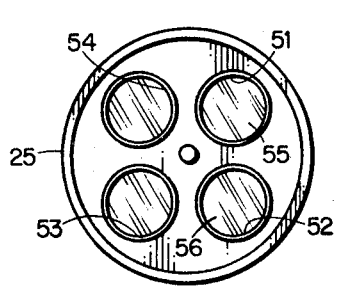
FIG. 4 is a front elevational view of the lens mounting member shown in the assembly of FIG. 2.
Figure 5:
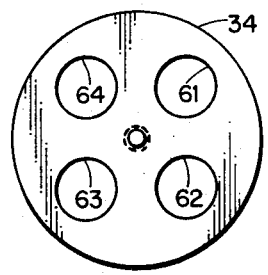
FIG. 5 is a front elevational view of the aperture disc of the assembly of FIG. 2.

It will be observed that the above principle is also applicable to the FIG. 2 embodiment which uses the lens arrangement of FIG. 4. Other means may also be used which automatically adjust the radial position of the projection lens as the lens is moved axially for focus adjustment. However, further particular mechanisms which might be used for this purpose need not be discussed here in any greater detail.

Having described several embodiments of the invention, it is likely that other embodiments, modifications and changes may occur to those skilled in the art and which are within the scope of this invention. Such modifications may include, among other things, various alternative arrangements of lenses and shutters. It is, of course, contemplated that slide transparencies with other than quadrature sector arrangement may be used and that suitable modifications to the projection apparatus may be made.

What is claimed is:

1. In a slide projector having means for retaining a multiple-sector slide transparency in position for projection of information contained thereon, apparatus operative to selectively project images of individual sectors of said multiple-sector slide transparency, said apparatus comprising:

a housing adapted for mounting to said slide projector forward of said slide transparency;

a plate mounted within said housing and having a plurality of apertures corresponding in number to the sectors on said slide transparency, each of said apertures being oriented in fixed alignment with a respective one of said sectors;

projection lens means mounted to said housing for focusing the images of each of said sectors at a single common location in a plane disposed a predetermined distance forward of said slide transparency, said projection lens means including a lens mounting member having a plurality of openings therein and a like plurality of projection lenses mounted in said openings; and shutter means having occluding means mounted to said housing for angular movement about an axis which is substantially parallel to the direction of sector image projection, said shutter means including a plurality of light opaque shutter vanes individually mounted for angular movement, said shutter vanes being operative together to project the images of selected ones of said slide sectors and alternatively to prevent projection of all the images of said slide sectors.

2. The apparatus recited in claim 1 wherein said shutter means comprises:

a shutter housing having an opening therethrough to permit passage of the image beams from the sectors of said slide transparency; and a plurality of solenoids mounted to said shutter housing, one of said shutter vanes being secured to the shaft of each solenoid and being rotatable therewith;

said shutter vanes each having a first position and a second position, said shutter vanes each being shaped and configured to interrupt the entire image beam of at least one of the sectors of said slide transparency when in said first position and to permit the projection of said light beam when in said second position.

3. The apparatus recited in claim 2 wherein said plurality of projection lenses is equal in number to the number of sectors in said slide transparency, each of said lenses being adapted to focus and direct the image of one sector of said slide transparency so that all of the sector images of said slide transparency are in focus and in coincidence at said plane.

4. The apparatus recited in claim 2 wherein said shutter vanes are three in number, each being configured to occlude half of the image beams of said slide transparency when in said first position and to occlude the other half of said image beams when in said second position, said shutter vanes being selectively operative together to permit the projection of the image of a single slide sector and alternatively to prevent the projection of all of the images of said sectors.

5. The apparatus recited in claim 2 wherein said shutter means is located forward of said slide transparency where the image beams are separate and distinct and rearward of the point at which said image beams commence to converge.

6. In a slide projector having means for retaining a multiple-sector slide transparency in position for projection of information contained thereon, apparatus operative to selectively project images of individual sectors of said multiple-sector slide transparency, said apparatus comprising:
  a housing adapted for mounting on said slide projector forward of said slide transparency;
  a projection lens mounting member secured within said housing and having a plurality of openings therein, each opening being aligned with a single sector of said slide transparency;
  a like plurality of projection lenses mounted in the openings in said mounting member, said lenses being adapted to cause the images of said slide sectors to be in focus and coincidence at a plane disposed a predetermined distance from said slide transparency;
  an aperture disc secured within said housing and having a like plurality of openings therein, each of said openings being aligned with one of said projection lenses; and
  shutter means mounted to said housing and having an opening therethrough to permit passage of the image beams from the slide sectors, said shutter means including a plurality of shutter vanes rotatably mounted to said shutter means, said shutter vanes each having a first position and a second position and being shaped and configured to selectively permit projection of individual ones of the image beams of said slide sectors and alternatively to prevent projection of all of said image beams.

7. The apparatus recited in claim 6 wherein;
  said slide transparency is divided into four sectors;
  said shutter vanes are three in number and each is configured to occlude two adjacent image beams when in said first position and to occlude the other two adjacent image beams when in said second position;
  said shutter means includes means for individually controlling the position of each of said shutter vanes;
  said shutter vanes being co-operatively controllable to occlude all of said image beams and alternatively to permit projection of a single selected image beam.

8. The apparatus recited in claim 6 wherein:
  said slide transparency is divided into four sectors;
  said shutter vanes are four in number and each is configured to occlude a single image beam when in said first position and to permit projection of said image beam when in said second position;
  said shutter means includes means for individually controlling the position of each of said shutter vanes;
  said shutter vanes being controllable to occlude all of said image beams and alternatively to selectively project any number of said image beams.

9. The apparatus recited in claim 2 wherein:
  said shutter vanes are four in number and each is configured to occlude a single image beam when in said first position and to permit projection of said image beam when in said second position;
  said shutter means include means for individually controlling the position of each of said shutter vanes;
  said shutter vanes are controllable to occlude all of said image beams and alternatively to selectively project any number of said image beams.

* * * * *